United States Patent [19]

Haley et al.

[11] 3,722,961
[45] Mar. 27, 1973

[54] ENDLESS TRACK

[75] Inventors: John S. Haley, Lake Junaluska; Jerry W. Cooper, Waynesville, both of N.C.

[73] Assignee: Dayco Corporation, Dayton, Ohio

[22] Filed: Apr. 22, 1971

[21] Appl. No.: 136,422

[52] U.S. Cl..........................305/25, 180/5 R, 305/38
[51] Int. Cl..........................B62m 27/02, B62d 55/24
[58] Field of Search................305/35 EB, 38, 16, 24; 74/231 C; 180/5 R

[56] References Cited

UNITED STATES PATENTS

| | | | |
|---|---|---|---|
| 1,378,379 | 5/1921 | Radell | 305/35 EB |
| 1,438,859 | 12/1922 | Rimailho | 305/35 EB |
| 2,870,490 | 1/1959 | Freedlander | 74/231 C |
| 3,575,474 | 4/1971 | Russ | 305/35 EB |
| 3,485,312 | 12/1969 | Swenson | 180/5 R |
| 3,510,174 | 5/1970 | Lamb | 180/5 R X |
| 3,658,392 | 4/1972 | Perreault | 180/5 R |
| 3,690,741 | 9/1972 | Pierson | 305/57 |

*Primary Examiner*—Richard J. Johnson
*Attorney*—Reuben Wolk

[57] ABSTRACT

An endless track is provided which is particularly adapted to be supported by a slide rail suspension system and moved in an endless path thereabout. The endless track comprises a main body portion having a ground engaging surface and an inside surface and is provided with a plurality of bearing inserts fixed to the main body portion and such inserts comprise a part of the inside surface. Each of the inserts is arranged in an associated row which extends in an endless path and each insert has an outside bearing surface which is adapted to engage associated rails of the slide rail system for movement of the track about such slide rail system with optimum flexibility and in a substantially frictionless manner. Certain ones of the inserts may have means for guiding the track as it is moved along its slide rail system.

16 Claims, 14 Drawing Figures

Patented March 27, 1973

INVENTORS
JOHN S. HALEY
JERRY W. COOPER

BY Reuben Wolk

ATTORNEY

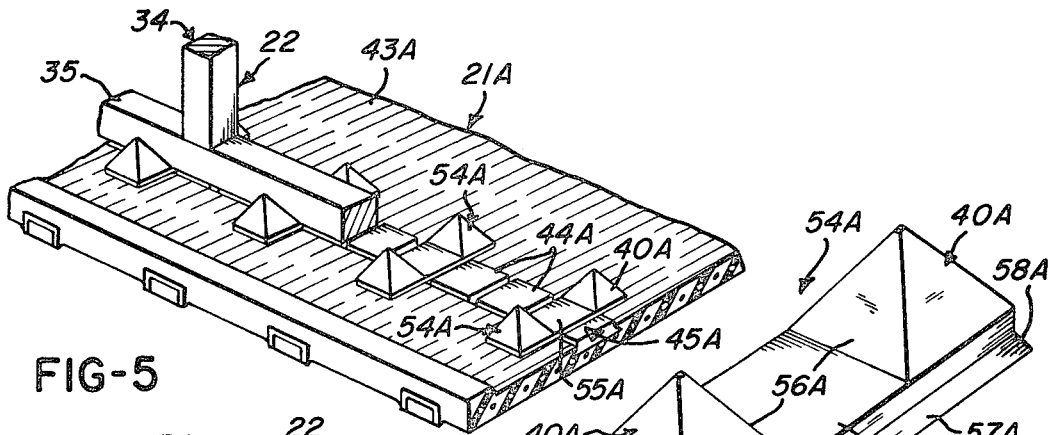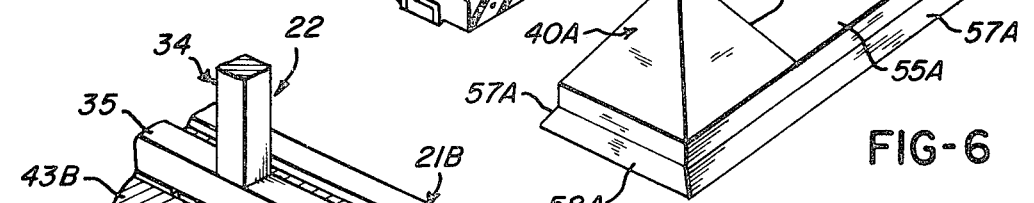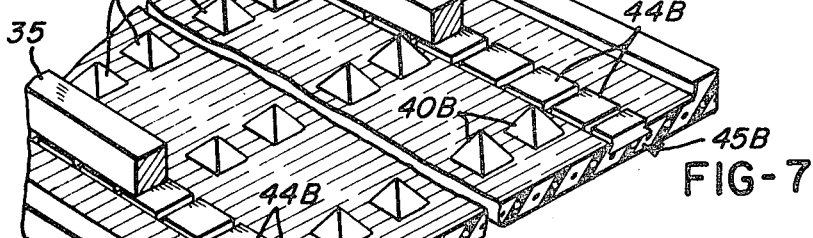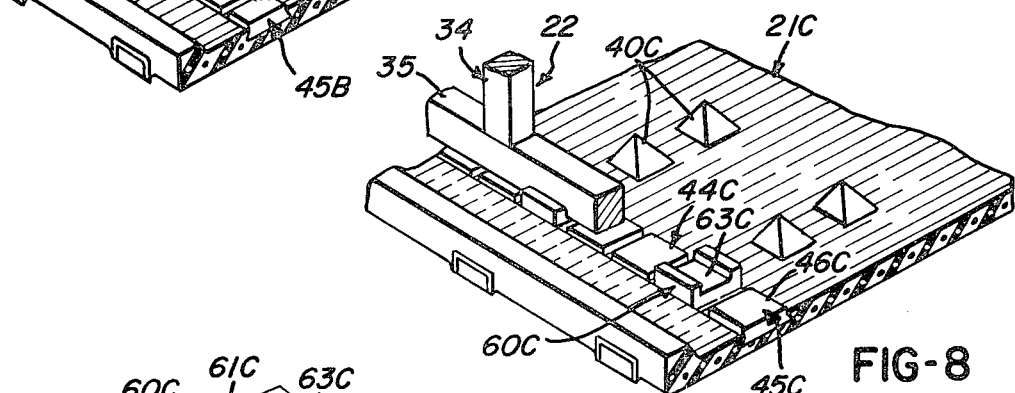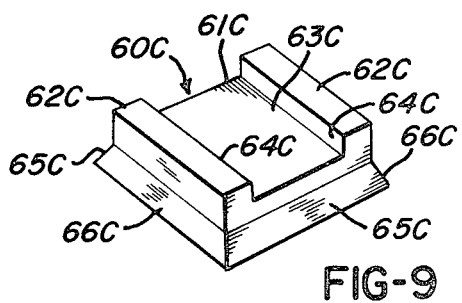

Patented March 27, 1973

INVENTORS
JOHN S. HALEY
JERRY W. COOPER

BY Reuben Wolk

ATTORNEY

ENDLESS TRACK

BACKGROUND OF THE INVENTION

Snowmobiles, tractors, and similar vehicles may be driven by endless traction belts or tracks made primarily of elastomeric materials which have been suitably reinforced and such tracks may be supported for movement in their endless paths by an associated slide rail system. However, in moving an endless track along associated rails of a slide rail system it is important that movement be provided with minimum friction and minimum wear of those portions of the endless track which engage the slide rails.

The endless tracks proposed previously for use on a slide rail system are comparatively stiff and inflexible during movement thereof in their associated endless paths whereby each of these previous tracks is usually driven by standard sprocket wheels having teeth extending through openings in the track in order to assure movement thereof about its slide rail system. Further, the frictional resistance normally encountered in moving these previously proposed tracks about a slide rail system is comparatively great resulting in poor performance. Thus, these two factors of inflexibility and high frictional drag of previous tracks have made it impractical heretofore to provide drive means of the "inside type" on endless tracks adapted to be used on an associated slide rail system.

SUMMARY

This invention provides an improved endless track particularly adapted to be used in combination with a slide rail system and such endless track, due to its unique bearing inserts, may be of the type driven by drive sprockets having teeth extending through cooperating openings in the track itself or may be of the type driven by sprockets engaging projections extending from an inside surface of the endless track.

The endless track comprises a main body portion having a ground engaging surface and an inside surface and is provided with a plurality of bearing inserts fixed to the main body portion and such inserts comprise a part of the inside surface. Each of the inserts is arranged in an associated row which extends in an endless path and each insert has an outside bearing surface which is adapted to engage associated rails of a slide rail system for movement of the track about such slide rail system with optimum flexibility in a substantially frictionless manner. Certain ones of the inserts may have means for guiding the track as it is moved along its slide rail system.

Other details, uses, and advantages of this invention will be readily apparent from the exemplary embodiments thereof presented in the following specification, claims, and drawings.

BRIEF DESCRIPTION OF THE DRAWINGS

The accompanying drawings show present preferred embodiments of this invention, in which

FIG. 5 is an enlarged fragmentary view similar to FIG. 3 illustrating another exemplary embodiment of an endless track having inserts provided with integral projections extending from opposite end portions thereof which are adapted to be driven by an associated drive sprocket;

FIG. 6 is an enlarged perspective view of a typical insert comprising the track of FIG. 5;

FIG. 7 is a view similar to FIG. 3 illustrating still another exemplary embodiment of an endless track of this invention;

FIG. 8 is an enlarged fragmentary view similar to FIG. 3 illustrating another exemplary embodiment of an endless track which also employs inserts having a substantially U-shaped cross-sectional configuration to further assure the track does not move transverse its slide rail system;

FIG. 9 is a perspective view of a typical U-shaped insert comprising the track of FIG. 8;

DESCRIPTION OF ILLUSTRATED EMBODIMENTS

Figure 1:
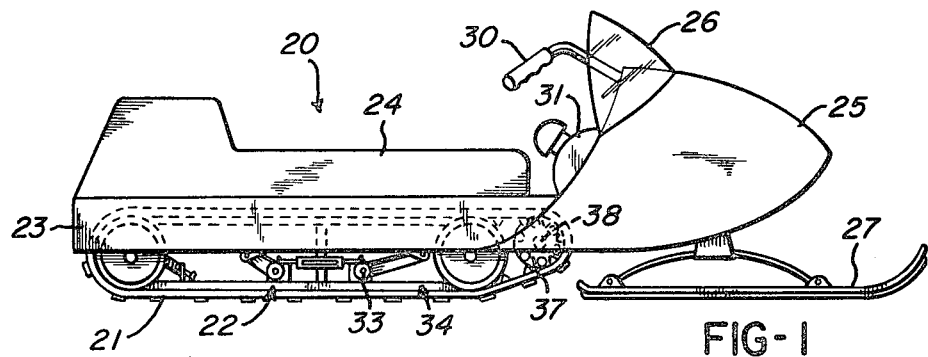
FIG. 1 is a side elevation of an exemplary vehicle in the form of a snowmobile which utilizes a slide rail system and one exemplary embodiment of an endless track of this invention which is driven using projections extending from the inside surface of such track.

Reference is now made to FIG. 1 of the drawings which illustrates a typical vehicle in the form of a conventional snowmobile 20 which employs an endless traction belt of track 21 and a slide rail system 22 in accordance with the teachings of this invention. The snowmobile 20 comprises an elongated main body portion 23 having a passenger-carrying seat 24 on the rear portion thereof and a front portion comprised of a streamlined hood 25 having a wind shield 26 with the hood and forward portion being supported by a pair of skis 27 in a conventional manner. The skis 27 are suitably mounted to the snowmobile in a conventional manner and are operatively connected to a handle bar 30 which is moved by an operator to move the skis and steer the snowmobile. The snowmobile 20 has a drive motor 31 which is suitably operatively connected to the endless track 21 in a manner to be described subsequently.

Figure 2:
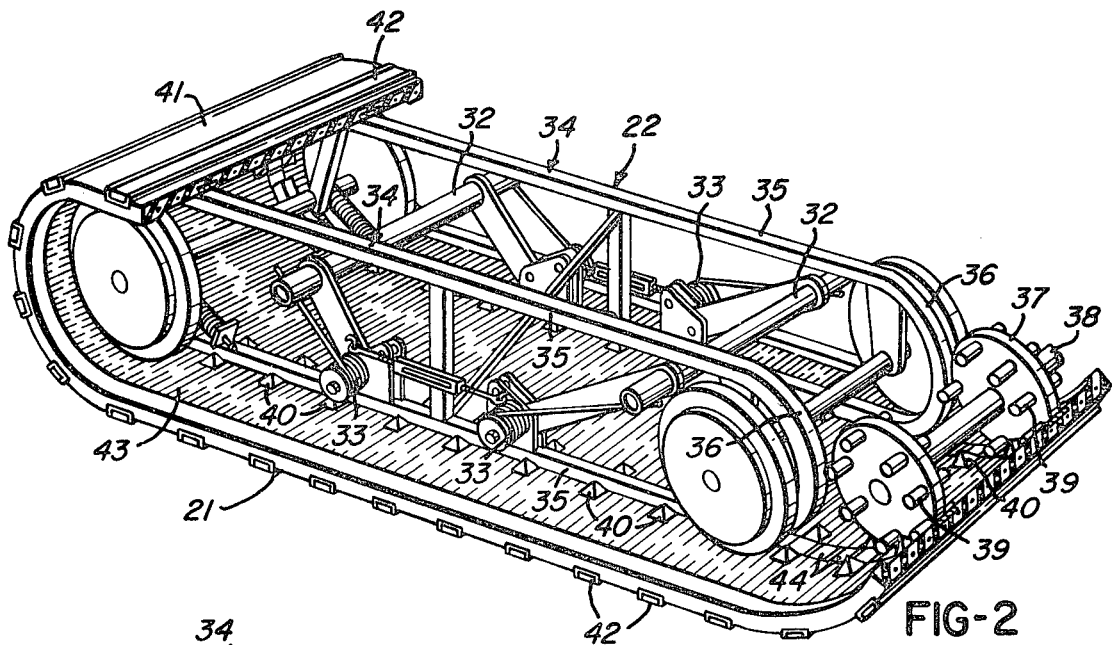
FIG. 2 is a perspective view with parts broken away of the slide rail system and endless track comprising the snowmobile of FIG. 1.

The exemplary slide rail system 22 has a pair of transverse supporting rods 32 which are yieldingly urged upwardly by associated mechanical springs 33 and each rod 32 has its opposite ends fixed to the main body portion 23 of the snowmobile 20 in a conventional manner. The rods 32 carry the rear portion of the snowmobile 20 and the springs 33 serve to cushion the ride of a party seated on the seat 24, also see FIG. 2.

The slide rail system 22 comprises a pair of spaced parallel rail units 34 and each rail unit includes horizontally arranged upper and lower rails each designated by the same reference numeral 35 and arcuate rail portions 36 adjoining the ends of the horizontal rails 35 of each unit. However, it will be appreciated that in some applications, rail units similar to rail unit 34 may be provided with the top slide rails eliminated. The rail units 34 with their associated rails 35 support and guide the endless track 21 for movement in its endless path.

The snowmobile 20 has a conventional drive sprocket assembly which includes a pair of identical drive sprockets 37 fixed to opposite ends of a shaft 38 which is suitably rotatably supported by the body portion 23. A mechanical connection in the form of a gear assembly (not shown) is provided for connecting the shaft 38 to the motor 31.

Each drive sprocket 37 has a central disc-like portion provided with a plurality of driving projections 39 of conventional construction extending outwardly from opposite sides of the central portion. The driving projections engage associated projections 40 provided on and extending from the inside surface of the main body portion of the endless track 21 to drive such track in its endless path about the slide rail system 22. The projections 40 of the exemplary track 21 are defined as an integral part of the main body portion and of the same elastomeric material comprising the body portion.

Figure 3:
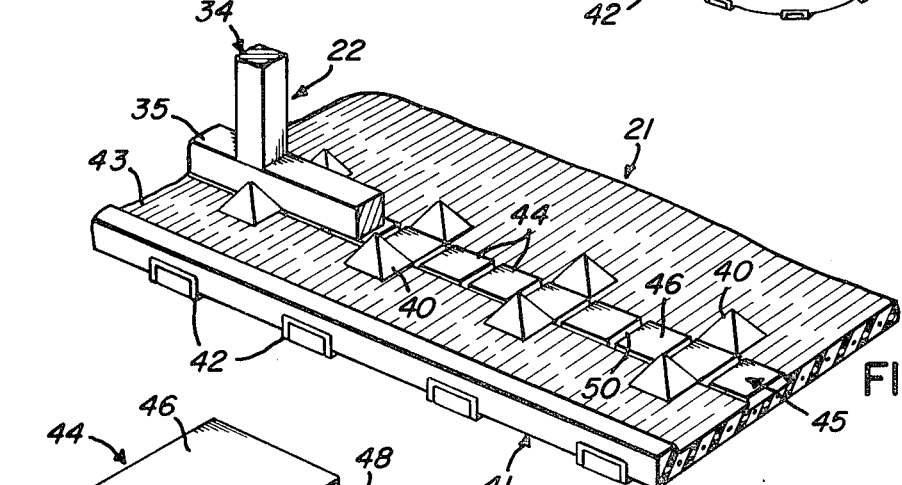
FIG. 3 is an enlarged fragmentary perspective view of a horizontally arranged portion of the track of FIG. 2 particularly illustrating the arrangement of one set of flat bearing inserts comprising such track and showing the position of one of the slide rails of the slide rail system.

As seen particularly in FIG. 3, the track 21 has a ground engaging surface 41 provided with traction cleats 42 extending thereacross and has an inside surface 43. The traction cleats 42 may be separate members embedded in the main body portion and made of any suitable metallic or nonmetallic material; however, such cleats may be made as integral raised projections in the main body portion and of the same elastomeric material comprising such body portion.

The track 21 also has a plurality of bearing inserts which will be referred to simply as inserts 44 fixed to the main body portion of the track 21 in a manner to be described in detail subsequently. The inserts 44, and in particular their exposed surfaces, comprise a part of the inside surface 43 of the track 21. Each insert 44 is arranged and fixed in position in an associated row thereof and the track 21 has a pair of rows of inserts 44 with each row being designated by the same general reference numeral 45.

Figure 4:
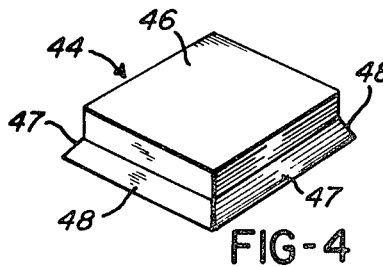
FIG. 4 is an enlarged perspective view of a typical insert comprising the track of FIG. 3.

Each bearing insert 44 has an outside bearing surface 46, also see FIG. 4, which is adapted to engage associated slide rails 35 and 36 of the slide rail system 22 and allow movement of the track 21 about its endless path and about slide rail system 22 in a substantially frictionless manner. Each insert 44 also has opposed beveled edges or surfaces 47 which are arranged substantially perpendicular to the rail 35 and the beveled edges 47 of a pair of immediately adjacent inserts 44 define a roughly V-shaped groove 50. Each insert 44 also has opposed beveled side edges 48 which allow elastomeric material comprising the track 21 to engage such beveled edges and help hold the particular insert 44 firmly in position.

As can be seen in the drawings, the base portion is embedded in the main body portion and has a configuration interlocking therewith.

Thus, the track 21 is of the inside drive type and is driven utilizing conventional drive sprockets 37 engaging integral projections 40 extending from the main portion of the track. The inserts 44 with grooves 50 provide improved circumferential flexibility for the track 20 as it moves in its endless path; and, in particular, allow free movement of track 21 around the arcuate ends of the slide rail system 22 even under conditions where the spacing between parallel rails 35 of a particular rail unit 34 is comparatively small whereby arcuate rail portions 36 have a correspondingly small radius. The inserts 44 also serve as wear strips preventing excessive wear during contact with the rails 35 and 36 and are made of a suitable material which allows sliding movement in a substantially frictionless manner.

Other exemplary embodiments of endless tracks of the "inside drive type" which are each adapted to be driven by an associated sprocket assembly engaging projections extending from the inside surface of the particular track are illustrated in FIGS. 5, 7, and 8. The tracks illustrated in FIGS. 5, 7, and 8 are similar to the track 21; therefore, these tracks will be designated generally by the reference numerals 21A, 21B, and 21C for the tracks of FIGS. 5, 7, and 8 respectively and representative parts of each track which are similar to corresponding parts of the track 21 will be designated by the same reference numeral as in the track 21 followed by an associated letter designation, either A, B, or C, and not described again. Only those component parts of each track which are different from corresponding parts of the track 21 will be designated by a new reference numeral also followed by an associated letter designation and described in detail.

It should also be understood that the tracks 21, 21A, 21B, and 21C will each operate on an associated slide rail system 22 having slide rail units 34 including horizontal rails 35 and arcuate rails 36 and certain rails will be illustrated in FIGS. 5, 7, and 8 of the drawings without being given a letter designation corresponding to its associated track.

The track 21A is shown in FIG. 5 and in addition to utilizing flat bearing inserts 44A also has special bearing inserts 54A fixed to the main body portion thereof, also see FIG. 6 for a typical insert 54A. Each row 45A of inserts is defined by an insert 54A followed by a pair of flat inserts 44A followed by another insert 54A, etc., about the entire endless path of the track 21A.

As stated earlier, the projections 40 of track 21 are made of elastomeric material extending outwardly from the main body portion as an integral part thereof; however, in the track 21A it will be seen that each projection 40A is defined as an integral part of its associated spacer 54A whereby a pair of projections 40A extend outwardly from opposite end edge portions of each insert 54A. The projections 40A are adapted to be engaged by an associated drive sprocket in a similar manner as the projections 40 for the track 21 and each insert 54A has an outside bearing surface 55A arranged between projections 40A. Further, the projections 40A are adapted to receive a rail therebetween so that inside surfaces 56A of projections 40A serve as guide surfaces and present movement of the track 21A transverse to its slide rail system 22 while each surface 55A engages and slides along its associated rails 35 and 36. It will also be seen that each insert 54A has beveled surfaces 57A, also see FIG. 6, comprising its opposite ends and beveled surfaces 58A comprising its opposite sides which serve similar functions as the beveled surfaces 47 and 48 of insert 44.

The track 21A has flat inserts 44A arranged between each immediately adjacent pair of inserts 54A; however, such track may be modified to remove the flat inserts and allow a recess in the elastomeric material comprising the main portion of the track 21A whereby the track 21A could be supported and driven solely by using aligned inserts 54A having a comparatively wide spacing therebetween.

The track 21B illustrated in FIG. 7 has integral projections 40B extending from its inside surface 43B and the projections 40B are adapted to be driven by a conventional drive sprocket in a similar manner as the projections 40 of the track 21. However, rather than having bearing inserts 44B arranged between the projections 40B extending from the inside surface of the belt 43B so that the slide rails of the slide rail system 22 are also arranged between projections 40B, a plurality of flat inserts 44B are provided closely adjacent opposed side edges of the track 21B and arranged in a pair of spaced parallel rows 45B with rows of projections 40B arranged therebetween.

Thus, the parallel rail units 34 of the slide rail system 22 are provided with a larger spacing which provides improved lateral stability for the vehicle using track 21B. The track 21B is kept from moving transverse its associated slide system by the driving members of associated conventional drive sprockets 37 engaging projections 40B extending from the main portion of the track 21B.

In some applications of the track of this invention where exceptionally rough usage is expected, it may be desired to provide further means assuring that an associated track will be properly guided as it is moved in its endless path about a slide rail system 22, and in such applications a track such as track 21C illustrated in FIG. 8 is provided. The track 21C, in addition to having flat bearing inserts 44C provided as a part thereof, also has inserts 60C which have a roughly U-shaped cross-sectional configuration, when viewed in a direction parallel to the endless path of the track 21C, also see FIG. 9.

Each U-shaped insert 60C has a cross-sectional configuration defined by a bight 61C and a pair of spaced arms 62C extending from opposite end edges of the bight 61C and insert 60C also has an outside bearing surface 63C. Each insert 60C also has beveled surfaces 65C comprising its opposite ends and beveled surfaces 66C comprising its opposite sides which serve similar functions as the beveled surfaces 47 and 48 of the insert 44. The inserts 60C may be spaced along an associated row 45C of inserts which, in this instance, is comprised of flat inserts 44C and U-shaped inserts 60C, and the outside surfaces 46C and 63C of inserts 44C and 60C respectively assure that the track 21C may be readily moved in its endless path in a substantially frictionless manner while surfaces 64C of arms 62C are adapted to be engaged by the rails of an associated slide rail system 22 to guide the entire track 21C as it is moved in its endless path.

Figure 10:
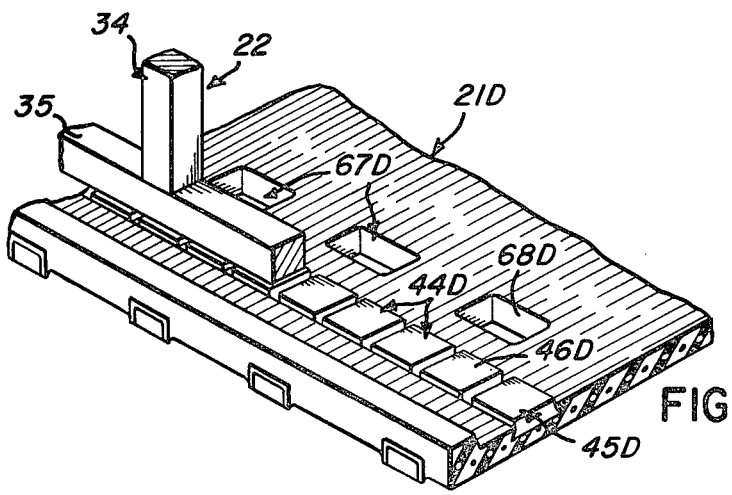
FIG. 10 is an enlarged perspective view illustrating another exemplary embodiment of an endless track of this invention which, in addition to rows of aligned bearing inserts, has aligned teeth-receiving openings therein adapted to receive teeth of an associated drive sprocket therethrough to enable driving the track about an associated slide rail system.
Figure 11:
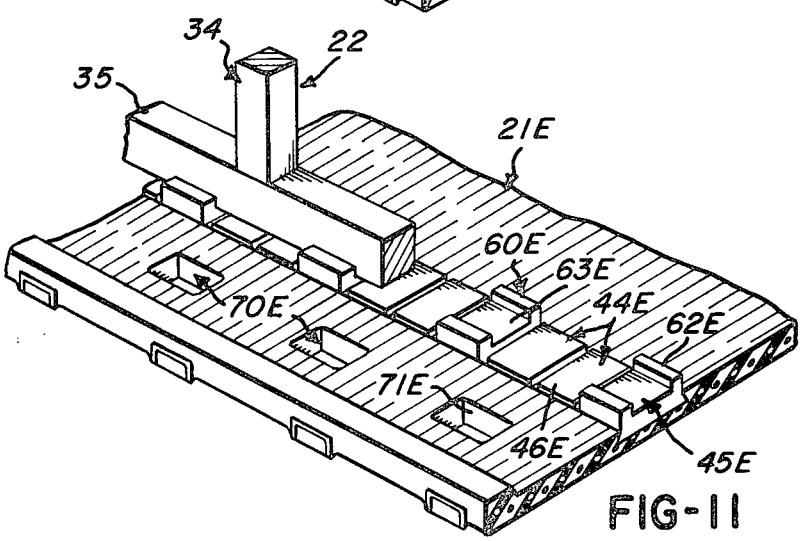
FIG. 11 is a view similar to FIG. 10 illustrating another exemplary embodiment of an endless track of this invention which also utilizes U-shaped inserts similar to the insert of FIG. 9.

As previously mentioned, the tracks 21, 21A, 21B, and 21C are of the inside drive type and, hence, each particularly adapted to be driven by an associated drive sprocket assembly which engages projections which extend from the inside surface of the track regardless of whether such projections are provided as an integral portion of the main body of a track or as a portion of a special bearing insert fixed to such main body. However, reference is now made to FIGS. 10 and 11 of the drawings which illustrate other exemplary embodiments of the track of this invention which are particularly adapted to be driven by drive sprockets having conventional sprocket teeth which are adapted to extend through associated drive sprocket openings of the associated track to enable driving such track about its endless path. With this exception, the tracks illustrated in FIGS. 10 and 11 are very similar to the track 21; therefore, such tracks will be designated generally by the reference numerals 21D and 21E for the tracks of FIGS. 10 and 11 respectively and representative parts of each track which are similar to corresponding parts of the track 21 will be designated by the same reference numeral as in the track 21 also followed by an associated letter designation either D or E and not described again. Only those component parts of each track which are different from corresponding parts of the track 21 will be designated by a new reference numeral also followed by an associated letter designation and described in detail.

The track 21D, see FIG. 10, utilizes a plurality of flat inserts 44D with each insert being arranged in an associated row 45D thereof and each insert 44D is suitably fixed adjacent an associated side edge of the track 21D. The outside surfaces 46D of the bearing inserts 44D are adapted to be engaged by slide rails 35 and 36 and in a similar manner as previously described for track 21 whereby track 21D may be moved in an endless path about its associated slide rail system 22.

The track 21D has a plurality of aligned drive sprocket openings 67D extending therethrough arranged in a pair of endless parallel rows with these rows being arranged between the rows 45D of inserts 44D. Each opening 67D is adapted to receive an associated tooth of a conventional drive sprocket therein to enable moving the track 21D about its slide rail system 22. Further, the sprocket teeth engaging opposed surfaces 68D defining each opening 67D prevent the track 21D from sliding transverse to and off the slide rail system 22.

The track 21E illustrated in FIG. 11 instead of having openings arranged inwardly of its rows of bearing inserts has aligned openings 70E arranged outwardly of a pair of parallel rows 45E of bearing inserts comprising such track. In a similar manner as the openings 67D, each opening 70E is adapted to receive an associated tooth of a conventional drive sprocket therein to enable moving track 21E about its slide rail system. The openings 70E are defined in part by opposed surfaces 71E and the sprocket teeth engaging such surfaces help keep the track 21E on its slide rail system 22.

Each row 45E of bearing inserts has flat bearing inserts 44E arranged between U-shaped bearing inserts which are substantially identical to the U-shaped bearing inserts 60C whereby such U-shaped bearing inserts are designated by the reference numeral 60E and component portions thereof will be given the same number designations as corresponding portions of the inserts 60C also followed by the letter designation E and not described again. The bearing inserts 60E cooperate with the flat inserts 44E so that their respective outside surfaces 63E and 46E are adapted to be engaged by the rails of the associated slide rail system 22. Further, the arms 62E of each insert 60E serve as guides to further assure that the track 21E is moved in its endless path in a true manner without movement transverse its slide rail system.

As indicated above, the tracks 21D and 21E have two sets of openings 67D and 70E respectively with each set being provided adjacent an associated side edge of its particular track. In addition, a pair of rows 45D of inserts are provided in the track 21D adjacent its opposite side edges and a pair of rows 45E of inserts are provided in the track 21E adjacent its opposite side edges. However, each of the tracks 21D and 21E may be moved in an endless path about an associated rail system 22 using only one set of aligned openings in the center of the particular track whereby only one drive sprocket with associated teeth would be required. Similarly, each track may be moved using more than two sets of openings and a corresponding number of sprockets.

Figure 12:
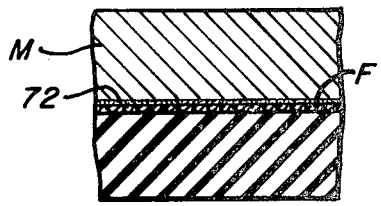
FIG. 12 is a fragmentary cross-sectional view illustrating one technique of fastening a typical insert regardless of its detailed configuration to an associated endless track.
Figure 13:
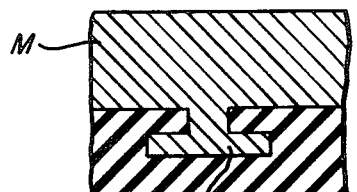
FIG. 13 is a view similar to FIG. 12 illustrating another technique for fastening a typical insert.
Figure 14:
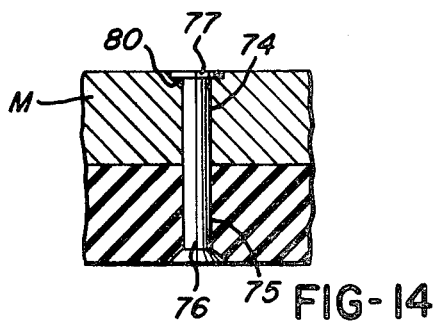
FIG. 14 is a fragmentary cross-sectional view similar to FIG. 12 illustrating still another technique for fastening a typical insert to an associated endless track.

The insert members or inserts 44, 44A-E, 54A, 60C, and 60E comprising various tracks disclosed herein may be attached to their associated tracks using any suitable attaching means or technique and reference is now made to FIGS. 12-14 of the drawings which illustrate three exemplary means of attaching these inserts to an associated track. For ease of presentation, only fragmentary portions of typical insert members or inserts are illustrated in FIGS. 12-14 and such inserts will be designated by the reference letter M in these FIGS. with it being understood such designation is fully applicable to each insert presented in this disclosure.

Each track 21, 21A, 21B, 21C, 21D, or 21E may have its main body portion made primarily or an elastomeric material such as rubber, urethane, or the like and may comprise a load-carrying or stretch layer F, see FIG. 12. The layer F may be made of a suitable fabric and embedded at any location in the main body portion of its track and is preferably impregnated with elastomeric material. Each insert M of a particular track may be fixed in a bonded manner adjacent or against the layer F and in some applications suitable adhesive means such as an adhesive 72 may also be employed to fix the insert in position.

Each insert M may, in some applications, have attaching means provided as an integral part thereof. For example, such attaching means comprise an integral offset portion defining the lower portion of the insert. In this example a T-shaped portion 73, see FIG. 13, extends beneath member M and is embedded within the elastomeric material comprising the main body portion of its associated track whereby all exposed surfaces of the T-shaped portion are in intimate contact with such elastomeric material and the elastomeric material serves as a matrix within which the T-shaped portion 73 is embedded. Preferably, the T-shaped portion 73 extends across the full width of the insert member M and in a direction perpendicular to the longitudinal axis of the row of inserts comprising the associated endless track.

The attaching means for a particular insert member M may also be in the form of an opening 74 extending through an associated member M which cooperates with an aligned opening 75 through the associated track whereby a separate fastener, such as a rivet 76, for example, may extend through the aligned openings 74 and 75 to fasten member M to its track in a riveted manner. Each fastener may have a head portion 77 which is received within a recess 80 in member M to assure that the head 77 does not extend above the plane of the exposed outside surface of the member which is adapted to be engaged by the slide rails of an associated slide rail system.

Each insert member 44, 44A, 44B, 44C, 44D, 44E, 54A, 60C, and 60E disclosed herein, and also referred to as insert M, may be made of any suitable material and utilizing any suitable manufacturing technique. Preferably, each insert has antifriction properties so that as its associated track is moved about the rails of an associated slide rail system movement may be accomplished with minimum frictional resistance. In addition, it will be appreciated that each insert member may have its outside surface suitably treated with a layer or coating of an antifriction material to provide antifriction properties. Also, the exposed surfaces of the slide rails which come into contact with the various insert members M may have suitable means in the form of an outer layer or suitable means or strips fixed thereto to reduce the frictional drag as each track is moved about its slide rail system.

While present exemplary embodiments of this invention, and methods of practicing the same, have been illustrated and described, it will be recognized that this invention may be otherwise variously embodied and practiced within the scope of the following claims.

What is claimed is:

1. An endless track adapted to be moved in an endless path and comprising, a main body portion having a ground engaging surface and an inner surface, and a plurality of bearing inserts fixed to said body portion and comprising a part of said inner surface, each of said inserts being arranged in a longitudinal row spaced inwardly from the lateral surfaces of said track, each of said inserts having an outer bearing surface made of rigid material dissimilar to the material of said main body portion, said bearing surface extending slightly inwardly of said inner track surface and adapted to engage associated rails of a slide rail system for said track in a frictionless manner, said inserts having a base portion having a generally flat innermost surface embedded in said main body portion, said base portion having a configuration interlocking with said body portion.

2. The track of claim 1 in which at least some of said inserts include a guiding member extending inwardly of said inner track surface and adapted to contact a side of a rail to prevent transverse movement of said track.

3. A track as set forth in claim 1 in which said embedded part has a roughly T-shaped configuration as viewed in cross section.

4. A track as set forth in claim 1 in which each of said inserts is made of a rigid material and has opposed beveled edges allowing free movement of said track in an arcuate path.

5. A track as set forth in claim 1 in which selected ones of said inserts have a roughly U-shaped cross-sectional configuration defined by a bight having said outside bearing surface and a pair of spaced arms extending from said bight on opposite sides of the bearing surface, said arms being adapted to receive a rail of said slide rail system therebetween to prevent movement of said track transverse said rail.

6. A track as set forth in claim 1 in which selected ones of said inserts have a pair of projections extending from their opposite end edge portions, each pair of projections being adapted to be engaged and driven by an associated inside-type drive sprocket and having said outer bearing surface arranged therebetween, said projections also preventing movement of said track transverse its endless path.

7. A track as set forth in claim 1 in which said body portion comprises a fabric layer and each insert is made of a rigid wear-resistant material and has an inside surface bonded in position adjacent said fabric layer.

8. A track as set forth in claim 7 in which said fabric layer comprises a layer impregnated with an elastomeric material and further comprising adhesive means bonding said inside surface to said impregnated fabric layer.

9. A track as set forth in claim 1 having a plurality of spaced openings therethrough arranged in at least one row which extends in an endless path, each of said openings being adapted to receive a tooth of an associated drive sprocket therein to enable moving said track in its endless path about said slide rail system.

10. In combination: a slide rail system having at least two parallel spaced rail units and an endless track adapted to be moved in an endless path about said slide rail system, said track comprising a main body portion having a ground engaging surface and an inner surface, and a plurality of bearing inserts fixed to said body portion and comprising a part of said inner surface, each of said inserts being arranged in a longitudinal row spaced inwardly from the lateral surfaces of said track, each of said inserts having an outer bearing surface made of rigid material dissimilar to the material of said main body portion, said bearing surface extending slightly inwardly of said inner track surface and adapted to engage associated rails of said rail system in a frictionless manner, said inserts having a base portion having a generally flat innermost surface embedded in said main body portion, said base portion having a configuration interlocking with said body portion.

11. The track of claim 10 in which at least some of said inserts include a guiding member extending inwardly of said inner track surface and adapted to contact a side of a rail to prevent transverse movement of said track.

12. A combination as set forth in claim 10 in which said inserts are arranged in endless rows corresponding in number to said number of rail units and each insert in each row has opposed beveled edges allowing free movement of said track about said slide rail system.

13. A combination as set forth in claim 10 in which selected ones of the inserts in each row have a roughly U-shaped cross-sectional configuration defined by a bight having said outside bearing surface and a pair of spaced arms extending from said bight on opposite sides of the bearing surface, said arms being adapted to receive a rail of said slide rail system therebetween to prevent movement of said track transverse said rail.

14. A combination as set forth in claim 10 in which selected ones of the inserts in each row have a pair of projections extending from their opposite end edge portions, each pair of projections being adapted to be engaged and driven by an associated inside-type drive sprocket and having said outer bearing surface arranged therebetween, said projections also preventing movement of said track transverse its endless path.

15. A combination as set forth in claim 10 in which said body portion of said track comprises a strength layer impregnated with an elastomeric material and each insert is made of a wear-resistant antifriction material.

16. A combination as set forth in claim 10, in which said track has a plurality of spaced openings therethrough arranged in at least one row which extends in an endless path, each of said openings being adapted to receive a tooth of an associated drive sprocket therein to enable moving said track in its endless path about said slide rail system.

* * * * *